(12) United States Patent
Ripley et al.

(10) Patent No.: US 9,660,869 B2
(45) Date of Patent: May 23, 2017

(54) COMBINING NETWORK ANALYSIS AND PREDICTIVE ANALYTICS

(71) Applicant: FAIR ISAAC CORPORATION, San Jose, CA (US)

(72) Inventors: John R. Ripley, Round Rock, TX (US); Brian E. Calvert, Dripping Springs, TX (US); Michael Betron, Austin, TX (US)

(73) Assignee: FAIR ISAAC CORPORATION, San Jose, CA (US)

( * ) Notice: Subject to any disclaimer, the term of this patent is extended or adjusted under 35 U.S.C. 154(b) by 196 days.

(21) Appl. No.: 14/533,968

(22) Filed: Nov. 5, 2014

(65) Prior Publication Data
US 2016/0127195 A1    May 5, 2016

(51) Int. Cl.
| | | |
|---|---|---|
| *G06F 15/16* | (2006.01) | |
| *G06F 15/173* | (2006.01) | |
| *H04L 12/24* | (2006.01) | |
| *G06F 7/36* | (2006.01) | |
| *G06Q 10/00* | (2012.01) | |
| *H04W 4/20* | (2009.01) | |

(52) U.S. Cl.
CPC .......... *H04L 41/147* (2013.01); *G06F 7/36* (2013.01); *G06Q 10/00* (2013.01); *H04L 41/145* (2013.01); *H04L 41/22* (2013.01); *H04W 4/206* (2013.01)

(58) Field of Classification Search
CPC ... H04L 41/147; H04L 41/22; H04L 67/2842; G06F 7/36

USPC ................................ 709/223, 224
See application file for complete search history.

(56) References Cited

U.S. PATENT DOCUMENTS

| | | | | |
|---|---|---|---|---|
| 8,473,422 | B2 * | 6/2013 | Shen | G06Q 30/02 705/26.1 |
| 8,712,952 | B2 * | 4/2014 | Soulie-Fogelman | G06Q 50/01 706/52 |
| 8,745,572 | B2 * | 6/2014 | Zimmermann | G06F 11/3604 717/101 |
| 8,843,431 | B2 * | 9/2014 | Anderson | G06Q 50/00 706/52 |
| 8,862,662 | B2 * | 10/2014 | Kao | G06Q 50/01 709/203 |
| 8,868,406 | B2 * | 10/2014 | Tirumalachetty | G06F 17/2745 704/9 |
| 8,873,813 | B2 * | 10/2014 | Tadayon | G06K 9/00 382/118 |
| 8,874,616 | B1 | 10/2014 | Coffman et al. | |
| 8,909,771 | B2 * | 12/2014 | Heath | G06Q 30/02 705/39 |
| 8,930,295 | B2 * | 1/2015 | Campbell | G06Q 40/00 706/46 |
| 9,147,272 | B2 * | 9/2015 | Ingrassia | G06T 11/001 |
| 9,148,347 | B2 * | 9/2015 | Galloway | H04L 41/142 |
| 9,166,943 | B2 * | 10/2015 | Hamilton, II | H04L 51/32 |

(Continued)

*Primary Examiner* — Melvin H Pollack
(74) *Attorney, Agent, or Firm* — Mintz Levin Cohn Ferris Glovsky and Popeo, P.C.

(57) ABSTRACT

Records are obtained from sources and typed datasets are assembled based on the obtained records. Relationships are identified among the typed datasets and at least one network comprising nodes and edges are assembled based on the identified relationships. A network analyzer assembles a vector and the vector is passed to analytics. The analytics then generate an output that is provided to a user or other device in the form of data.

19 Claims, 7 Drawing Sheets

(56) References Cited

U.S. PATENT DOCUMENTS

| | | | |
|---|---|---|---|
| 9,195,941 B2* | 11/2015 | Mojsilovic | G06Q 10/00 |
| 9,262,493 B1* | 2/2016 | Dietrich | G06F 17/30563 |
| 9,282,008 B2* | 3/2016 | Shah | H04L 67/10 |
| 9,299,042 B2* | 3/2016 | Eck | G06F 17/18 |
| 9,307,004 B1* | 4/2016 | Hayden | H04L 67/2838 |
| 9,311,682 B2* | 4/2016 | Splaine | G06Q 50/01 |
| 9,317,807 B1* | 4/2016 | Staddon | G06N 5/04 |
| 9,338,065 B2* | 5/2016 | Vasseur | H04L 41/5009 |
| 2009/0254971 A1 | 10/2009 | Herz et al. | |
| 2012/0150960 A1* | 6/2012 | Nalawade | G06Q 30/02 709/204 |
| 2013/0073473 A1* | 3/2013 | Heath | G06Q 30/02 705/319 |
| 2013/0096892 A1* | 4/2013 | Essa | G09B 7/00 703/2 |
| 2013/0117278 A1 | 5/2013 | Martens et al. | |
| 2013/0197970 A1* | 8/2013 | Aaskov | G06Q 30/02 705/7.31 |
| 2013/0262469 A1 | 10/2013 | Whitman | |
| 2014/0156231 A1* | 6/2014 | Guo | G06N 7/005 703/2 |
| 2014/0330968 A1* | 11/2014 | Zahoor | G06F 17/30539 709/224 |
| 2015/0049634 A1* | 2/2015 | Levchuk | H04L 41/14 370/254 |
| 2015/0149613 A1* | 5/2015 | Kakadia | H04L 47/823 709/224 |
| 2015/0242815 A1* | 8/2015 | Velasco | G06Q 10/1053 705/321 |
| 2015/0242856 A1* | 8/2015 | Dhurandhar | G06Q 50/01 705/44 |
| 2015/0256423 A1* | 9/2015 | Stearns | H04L 67/22 709/224 |
| 2015/0263925 A1* | 9/2015 | Shivashankar | H04L 67/306 706/12 |
| 2015/0341232 A1* | 11/2015 | Hofleitner | H04L 67/306 709/224 |
| 2016/0004972 A1* | 1/2016 | Alboszta | G06N 99/002 706/52 |
| 2016/0063144 A1* | 3/2016 | Cooke | G06F 17/5009 703/2 |
| 2016/0180248 A1* | 6/2016 | Regan | G06N 5/04 706/12 |

* cited by examiner

COMBINING NETWORK ANALYSIS AND PREDICTIVE ANALYTICS

TECHNICAL FIELD

The subject matter described herein relates to the combination of network analysis and predictive analytics.

BACKGROUND

The field of social network analysis (SNA) is the study of relationships, how people and things are related to one another, and the study of the network characteristics of those relationships. When people hear the term social network analysis, the common misconception is that it pertains exclusively to online social network (Facebook, Twitter, and LinkedIn etc.) data. Although the data contained in these social platforms could be valuable for social networks analysis, it is not required nor the prime use case of SNA. SNA is intended to build and analyze networks present in the in-house data of a user and optionally third-party data. In particular, SNA improves analytical decisions by understanding entities relative to their relationships with other entities within large sets of data.

SUMMARY

In a first aspect, records are obtained from sources and typed datasets are assembled based on the obtained records. Relationships are identified among the typed datasets and at least one network comprising nodes and edges are assembled based on the identified relationships. A network analyzer assembles a vector and the vector is passed to analytics. The analytics then generate an output that is provided to a user or other device in the form of data.

In another implementation, the data can be displayed, transmitted to a remote node, stored, or loaded in to a memory.

In another implementation, the model can be a predictive analytic, a decision analytic, a descriptive analytic, a node analytic, an edge analytic, a network analytic, or any combination thereof.

In another implementation, the dimension of the vector can be reduced to allow the analytic to process the vector.

In another implementation, the output can be passed back as input into the analytic based on a determination by the analytic that the output is to be passed back.

In another implementation, the output can be sorted into a sorted output.

In another implementation, the output can be assigned into categories based on the sorting.

Non-transitory computer program products (i.e., physically embodied computer program products) are also described that store instructions, which when executed by one or more data processors of one or more computing systems, causes at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter can be applied to determining fraud (e.g., collusive, insider) and customer behavior analytics (cross-sell, upsell, targeting, etc.). Additionally, a core capability of social network analytics, entity hub resolution, as provided herein can be applied across data quality initiatives (e.g., cleansing, master data management, etc.) and other solutions that require identity hub directory services (e.g. health information exchanges, employee master data management initiatives, etc.).

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Typically, predictive analytics and predictive models rely on lower dimensionality data than is afforded by a complex network structure. The current subject matter integrates network analysis with predictive analytics. Generally, a network, with its multi-dimensional and multi-attribute nature, can be distilled into a collection of simpler analytically derived attributes in the form a lower dimension vector space. The vector can be conveyed to analytics, which can make predictions, decisions, or classifications, in accordance with a known set of data or rules.

The conundrum of applying SNA to "Big Data" is that it generates even more data that requires review. The current subject matter applies analytics to those networks to distinguish those that warrant further attention from those that do not.

As one scenario, suppose an insurance company wishes to use SNA and analytics to flag automobile insurance claims in need of additional scrutiny. When claims are received, and as they are processed, the current subject matter can use a combined solution of profile analytics and social network analytics to score the claim according to the amount of risk within the claim.

Figure 1:
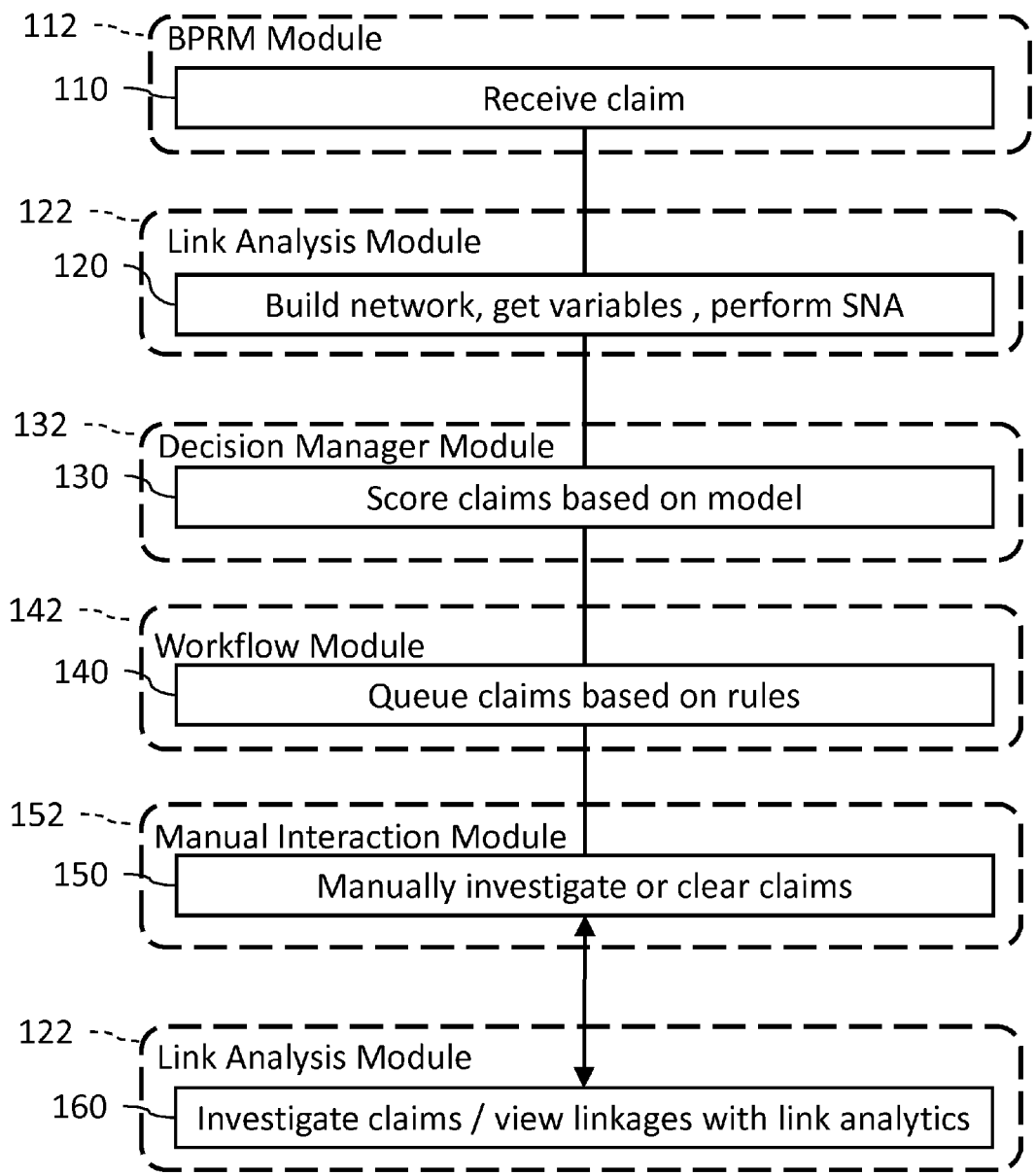
FIG. 1 is a process flow diagram illustrating a computer-implemented claim scoring and triaging process.

FIG. 1 is a process flow diagram 100 illustrating a computer-implemented claim scoring and triaging process.

In one implementation, there can be a Business Process Rules Management (BPRM) module 112, a link analysis module 122, a decision manager module 132, a workflow module 142, and a manual interaction module 142. Each module can be a set of computer-readable instructions that execute the functions unique to the module. The BPRM module 112 can be defined to execute code that processes, filters, or manipulates claims or other data in accordance with programming instructions or established business rules. The link analysis module 122 can execute code that analyzes links between the received data, e.g. find common keywords, names, conditions, or keys. The decision manager module 132 can execute code, which can include models and analytics described throughout the current subject matter and generates scores or other metrics as output. The workflow module 142 can execute code that can queue, order, sort, or otherwise organize or prioritize claims or other data based on programming instructions or business rules. The manual interaction module 152 can execute code that generally requires more user interaction, e.g. manually comparing sets of data, making decisions about claims, or sorting/adding/deleting information or records.

In one implementation, the modules can be used together, as part of larger computer program, to process claims. At 110, the claim is received in a Business Process Rules Management (BPRM) module 112. When the claim is first filed, the BPRM module 112 can process the claim and feed information about the processed claim to a link analysis module 122. A claim file can include a sort of data that identifies the claimant or other pertinent information about the claim or items that the claim has a relationship to. For example, a claim file can contain names, addresses, locations of incidents, claim histories, providers, or claim outcomes.

Thereafter, at 120, networks can be built and variables obtained by the link analysis module 122 by the transmission of data from the sources of claim information to link analysis module 122. The link analysis module 122 can then read the information and build a network based on shared policy numbers, addresses, incident IDs, etc. The link analysis module 122 can then extract the variable information (e.g. SNA) from the networks and the variables required for scoring (e.g., fraud profile scoring) and pass the information to a decision manager module (not shown), which forms part of the BPRM module 112.

Next, at 130, the claim can be scored. This scoring can be accomplished by the decision manager module 132 analyzing the network and profile variables against the models or other analytics, and scoring the claim with reason codes or any other set of instructions.

Next, at 140, the claims can be queued, triaged, and investigated. For example, a manager can define/set up queues for the investigators to review. The queuing can also be partially or completely automated by the workflow module 142.

At 150, the Manual Interaction Module can allow a user to manually look through the queued claims and modify, cancel, or otherwise manage the claims. Manual interaction by investigative users can be achieved through a user interface, typically on a computer, e.g. GUI's, or audio/visual/touch input devices.

At 160, for high scoring claims (e.g. high likelihood of fraud) investigators can have the ability to review various attributes regarding the claim. Investigators can also review links between claims, e.g. common locations, names, vehicles, or occurrences. The link analysis module 122 can include code, e.g. link analytics that analyze data to determine commonalities that can be used to aid the investigators.

Execution of any of the steps described by the current subject matter can be performed by a computer containing program code modules created to perform the aforementioned steps. The computer can be optimized for execution of the program code modules, e.g. handling large data sets or parallel processing.

Figure 2:
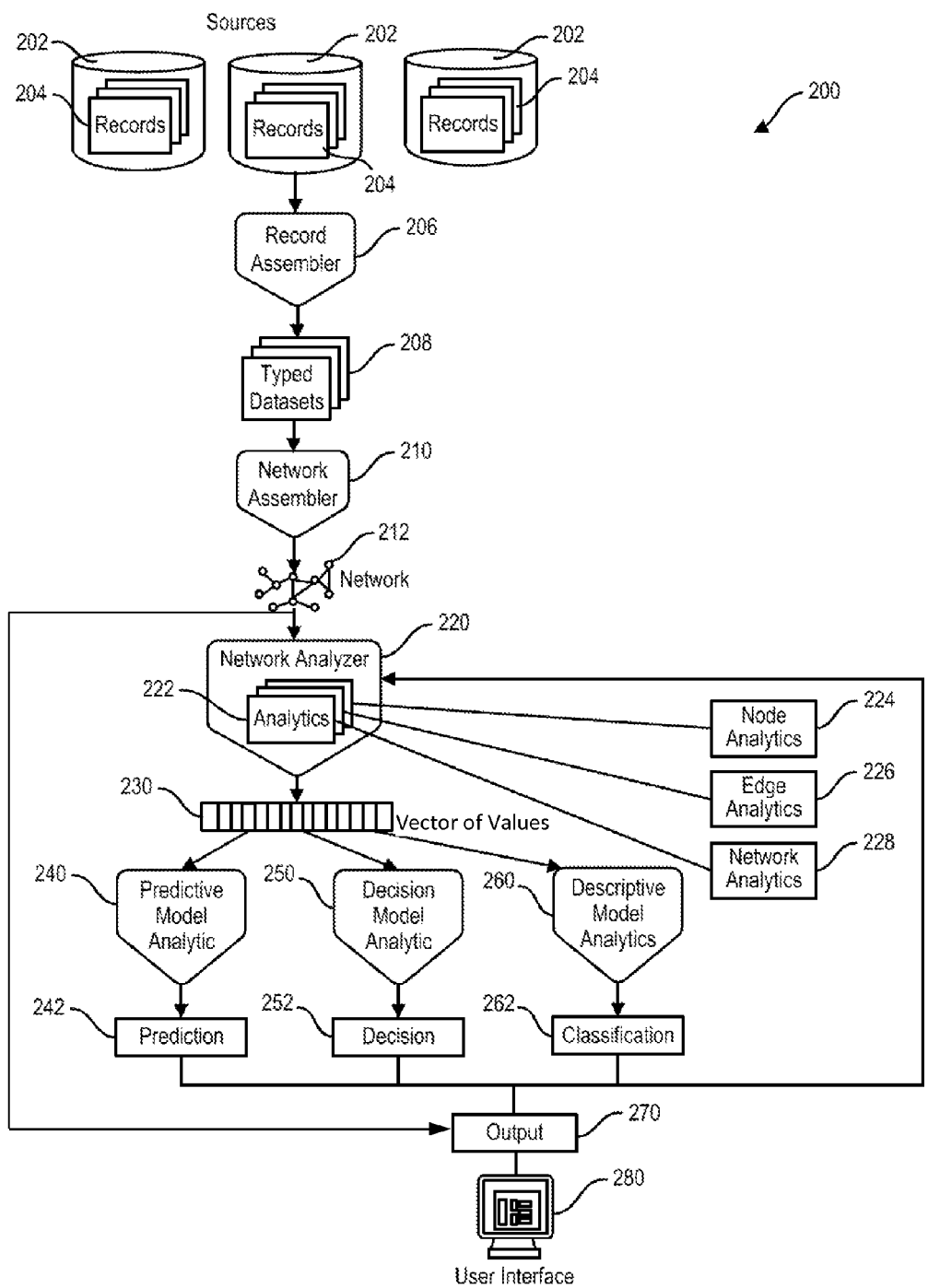
FIG. 2 is a process flow diagram illustrating a computer-implemented data pipeline.

FIG. 2 is a process flow diagram of a computer-implemented data pipeline 200. In one implementation, the data pipeline 200 can perform the actions described in 112, 122, and 132. The data pipeline 200 can accumulate records 204 from various sources 202, and assemble, via a record assembler 206, the records 204 into typed datasets 208. Next, a network assembler 210 can assemble networks, based on identified relationships among the typed datasets 208, and then transmit the typed datasets 208 to a network analyzer 220. The network analyzer 220 can analyze, based on the relationships discovered between the typed datasets 208, the network 212 using a series of analytics 222. The network analyzer 220 can reduce the dimensionality of the network 212 into a vector 230 and transmit the vector 230 to analytics such as a predictive model analytic 240, a decision model analytic 250, and/or a descriptive model analytic 260. The analytics can provide an output 270, which can be a prediction 242, a decision 252, and/or a classification 262. The output 270 can be passed back to the network 212 analyzer further analysis. The output 270 can be any form of data, e.g. text, images, tables, webpages, or GUI elements. Upon generating the output, i.e. the data, the data can be displayed, transmitted to a remote node, e.g. a computer or a user interface 280, mobile device, mainframe, or server, storing the data on the remote node, or loading the data into a memory The sources 202 are sources of data that hold the records 204 for clients, companies, or general data needed by the user. The sources 202 can be databases, mainframes, computer hard drives, or any type of storage medium that can interface with the data pipeline 200 to provide the records 204.

The record assembler 206 can be responsible for selecting records 204 in their native form, identifying their typed contents (names, addresses, DOBs, SSNs, etc.), and mapping them to a canonical form. The means by which the typed datasets 208 are typed, built, and managed can be accomplished using various methodologies, which can be static or dynamic in nature. The typed datasets 208 can be expressed in a tabular format, one example of which is provided below. Also, while reference is made to relational databases and tables, however, the type datasets 208 can be stored in a variety of formats, e.g. delimited files, web services, and NoSQL document stores.

Consider the following example: An auto insurance company maintains its claims data in a relational database. The data is broken up into four database tables: claim (contains general claim information), claimant (contains biographic information pertaining to individuals involved in a claim), vehicle (contains information regarding the vehicles involved in the accident), and provider (contains company information regarding the auto-body shops used to repair vehicles). A real claims system would contain many more fields and many more records 204 but for simplicity, this example illustrates two separate car accidents, each involving two cars. The data in the sources 202 can be stored as provided in Tables 1-4.

TABLE 1

Claim

| CLAIM_NO | CLAIM_DATE | POLICE_RPT_NO | LOC_STREET | LOC_CITY | LOC_STATE | LOC_ZIP | DESCRIPTION |
|---|---|---|---|---|---|---|---|
| 111-222 | Jun. 8, 2014 | 333-FGG-6 | 123 Main St | Austin | TX | 78730 | At approximately 12:37 am, the two drivers collided at a low rate of speed . . . |
| 111-333 | Jul. 1, 2014 | 992-DDR-7 | 234 Main St | Austin | TX | 78730 | On the morning of Jul. 1, 2014, the claimant's vehicle was travelling at a low rate . . . |

TABLE 2

Claimant

| CLAIM_NO | CLMT_NO | NAME | STREET | CITY | STATE | ZIP | PHONE_HOME | PHONE_MOBILE | DRIVERS_LIC |
|---|---|---|---|---|---|---|---|---|---|
| 111-222 | 1 | Dave Johnson | 3345 Maple Ave | Austin | TX | 78730 | 512-555-1212 | 512-555-1313 | TX7700-2 |
| 111-222 | 2 | Mike Smith | 313A Peachtree St | Round Rock | TX | 78664 | 512-555-3434 | 512-555-2323 | TX8879-2 |
| 111-333 | 1 | John Anderson | 4556 S Avalon | Austin | TX | 78330 | (none) | 512-555-4556 | TX333-3 |
| 111-333 | 2 | Paul Simpson | 98 West Palm Blvd | Austin | TX | 78534 | 512-555-4545 | 512-555-1212 | TX6664328-0 |

TABLE 3

Vehicle

| CLAIM_NO | VEHICLE_NO | MAKE | MODEL | YEAR | COLOR | VIN |
|---|---|---|---|---|---|---|
| 111-222 | 1 | Ford | Bronco | 1985 | White | XGH667FDEE4 |
| 111-222 | 2 | Mercury | Villager | 1995 | Green | 667HHJHJ55GGDS09 |
| 111-333 | 1 | Toyota | Sequoia | 2005 | White | HHF5DDBHH7554WW |
| 111-333 | 2 | Mercury | Villager | 1995 | Green | 667HHJHJ55GGOS09 |

TABLE 4

Provider

| CLAIM_NO | PROVIDER_NO | COMPANY | STREET | CITY | STATE | ZIP | PHONE | LICENSE_NO |
|---|---|---|---|---|---|---|---|---|
| 111-222 | 1 | ABC Automotive | 700 Congress Ave | Austin | TX | 78200 | 512-555-1111 | TX3334033 |
| 111-222 | 2 | ABC Auto | 700 Congress | Austin | TX | 78200 | 512-555-1111 | TX3334033 |
| 111-333 | 1 | ABC Autocare | 700A Congress | Austin | TX | 78200 | 512-555-1111 | TX3334033 |
| 111-333 | 2 | ABC Automotive | 700 Congress Ave | Austin | TX | 78200 | 512-555-1111 | TX3334033 |

The record assembler 206 turns records 204 (see Tables 1-4) into typed datasets 208 (see Tables 5-8) by sorting, merging, or otherwise organizing records 204. In Table 5, the records 204 have been grouped by name, the record length having four entries corresponding to the names of the four claimants. In Table 6, all addresses relevant to the cases have been assembled to include not only the addresses of the claimants, but also the addresses of the incident associated with the claims and the providers for each of the claimants. Table 7 contains data grouped by phone number for the claimants in question, but also includes key information as well, illustrating that a source with a single phone number can also have multiple keys associated with multiple cases. Similarly, Table 8 is grouped by Vehicle Identification Number (VIN).

TABLE 5

Names

| ID | SOURCE | KEY | VALUE |
|---|---|---|---|
| 1 | CLAIMANT | 111-222-1 | Dave Johnson |
| 2 | CLAIMANT | 111-222-2 | Mike Smith |
| 3 | CLAIMANT | 111-333-1 | John Anderson |
| 4 | CLAIMANT | 111-333-2 | Paul Simpson |

TABLE 6

Addresses

| ID | SOURCE | KEY | VALUE |
|---|---|---|---|
| 1 | CLAIMANT | 111-222-1 | 3345 Maple Ave, Austin, TX |
| 2 | CLAIMANT | 111-222-2 | 313A Peachtree St, Round Rock, TX |
| 3 | CLAIMANT | 111-333-1 | 4556 S Avalon, Austin TX |
| 4 | CLAIMANT | 111-333-2 | 98 West Palm Blvd, Austin, TX |
| 5 | CLAIM | 111-222 | 123 Main St, Austin TX |
| 6 | CLAIM | 111-333 | 234 Main St, Austin, TX |
| 7 | PROVIDER | 111-222-1 | 700 Congress Ave, Austin, TX |
| 7 | PROVIDER | 111-222-2 | 700 Congress, Austin, TX |
| 7 | PROVIDER | 111-333-1 | 700A Congress, Austin, TX |
| 7 | PROVIDER | 111-333-2 | 700 Congress Ave, Austin, TX |

TABLE 7

Phones

| ID | SOURCE | KEY | VALUE |
|---|---|---|---|
| 1 | CLAIMANT | 111-222-1 | 512-555-1212 |
| 2 | CLAIMANT | 111-222-2 | 512-555-3434 |
| 3 | CLAIMANT | 111-333-2 | 512-555-4545 |
| 4 | CLAIMANT | 111-222-1 | 512-555-1313 |
| 5 | CLAIMANT | 111-222-2 | 512-555-2323 |
| 6 | CLAIMANT | 111-333-1 | 512-555-4556 |
| 1 | CLAIMANT | 111-333-2 | 512-555-1212 |

TABLE 8

VIN's

| ID | SOURCE | KEY | VALUE |
|---|---|---|---|
| 1 | VEHICLE | 111-222-1 | XGH667FDEE4 |
| 2 | VEHICLE | 111-222-2 | 667HHJHJ55GGDS09 |
| 3 | VEHICLE | 111-333-2 | HHF5DDBHH7554WW |
| 2 | VEHICLE | 111-222-1 | 667HHJHJ55GGOS09 |

Each of Tables 5-8 is an example of the typed datasets 208. Again, in this example we are storing these entities in a relational database table but their persistent form could equally be a delimited file, a web service, or a NoSQL database. Please note the ID column of the entities. As part of the record assembly process, the record assembler 206 has identified similar (inexact but close) records and grouped them under a common ID. In the example, we have address #7, phone #1, and VIN #2 which contain multiple similar instances.

The network assembler 210 can identify relationships among the typed datasets 208 to build a connected graph or network 212. The network 212 can be constructed of any number of nodes and edges. Nodes can reference entities or groups of entities within the typed datasets 208, e.g. claimants, addresses, or VIN's. Edges can reference connections or relationships between nodes. For example, for claimants involved in the same claim, there can be edges that connect the claimants to each other. The relationships can be explicit (e.g., key-foreign key such as account number) or implicit (e.g., one or more relevant attributes are similar). Edges can also contain information about the relationships between the nodes that they connect, e.g. weightings or distances. The assembled networks 212 can be saved to a database or transmitted to the next process. The assembling of the network 212 can be done in any number of steps or with any method for network assembly by a computer program or program module. Also, at any point during network assembly, relationships between the network 212 and other networks can be marked, highlighted, saved, or brought to the attention to a user.

The network analyzer 220 can apply a configurable collection of analytics to the network 212. The analytics can be sub-programs of, or modules used by, the network analyzer 220. Analytics can be applied to individual nodes or edges or to the network 212 as a whole. The analytics can use data associated with the nodes and can reference records 204 or typed datasets 208 that the nodes represent. There can be multiple types of analytics, and in one implementation, the analytics can include node analytics 224, edge analytics 226, and network analytics 228.

The node analytics 224 can make determinations regarding one or more nodes. These determinations can be made in any number of ways, e.g. in response to queries that the node can receive or be retrieved from tables or other relational databases that reference the node. By definition, the node analytics 224 can require, at a minimum, a single node from the network 212 and possibly the all of the nodes in the network 212. Examples of the types of queries that the node analytics 224 can address are "is this individual on a watch list," "is this individual connected to an individual on a watch list through a phone number", "how many individuals is this individual connected to," "what is the degree (connectedness) of this node," or "what's the centrality of the node?" Determinations of queries can require additional function calls either embedded within the node or called by other program modules.

The edge analytics 226 determine, or return data regarding, relationships between nodes that are connected by edges. Similar to the node analytics 224, the edge analytics 226 can be made in any number of ways, e.g. in response to queries that the edge can receive or be retrieved from tables or other relational databases that reference or define the edge. By definition, edge analytics 226 require at a minimum a single edge/node relationship, most likely the nodes at either end of the edge, and possibly the entire network 212. Examples of the types of queries that the edge analytics 226 can address are "is this a relationship between an employee and a customer," "do individual A and individual B share more than 3 attributes?"

The network analytics 228 can determine, or return data regarding, the network 212. Network analytics 228 can require the entire network 212 to run, or the network analytics 228 can operate on a subset of the network 212. Examples of the types of queries that the network analytics 228 can address are "calculate the average dollar amount of transactions going between Person A and Person B," "does this graph contains a record from a watch list," "is this graph fully connected," "does this graph contain a middle-man structure?" The network analytics 228 can also analyze time-series data to determine, among other things, the change in or trends of the network 212 over time. One example of the output 270 of the network analytics 228 is shown in Table 9. In our example, the network analytics 228 can calculate quantities that describe the network 212, e.g. number of claims, number of claimants, or number of shared addresses.

TABLE 9

| ANALYTIC | DESCRIPTION | VALUE |
| --- | --- | --- |
| NUM_CLMS | Number of Claims | 2 |
| NUM_CLMNTS | Number of Claimants | 4 |
| NUM_SHARED_ADDR | Number of Shared Addresses | 1 |
| NUM_SHARED_PHONE | Number of Shared Phones | 1 |
| SAME_CAR | Contains same car, different incidents? | 1 |
| ACYCLIC | Does graph contain a cycle? | 0 |
| NUM_R_NODES | Number of record nodes | 14 |
| NUM_A_NODES | Number of attribute nodes | 16 |
| MAX_DIST_CLMNT_PROV | Max geo distance between claimant address and provider address | 37.4 |
| AVG_DIST_CLMNT_PROV | Avg geo distance between claimant address and provider address | 30.8 |
| CONTAINS_DISP_PHONE | Contains a home phone listed as a disposable/pay-as-you-go phone number | 1 |
| CLMNT_ADDR_POLY | A polygon representation of claimant addresses in lat/long form | {30° 16' 0" N/97° 44' 22" W; 30° 16' 0" N/97° 45' 34" W; 30° 17' 0" N/97° 44' 00" W; 30° 16' 0" N/97° 44' 31" W} |
| DESCRIPTION | Description of accident | {111-222: At approximated 12:37am, the two drivers collided at a low rate of speed . . . ; 111-3333: On the morning of Jul. 1, 2014, the claimant's vehicle was travelling at a low rate . . .} |
| Etc . . . | | |

The output 270 of the network analyzer 220 can be a vector 230. The vector 230 can be a list, array, object, linked list, table, or even a single entity that can be used as input to one or more model analytics, described below. Often the model analytics require particular input, or have other limitations as to what the model analytic can process. The vector 230 can be any type of output 270 that satisfies the required format for a model analytic, e.g. tabular, array, linked list, or n-dimensionality. The vector 230 generally has a lower dimensionality than the network 212, though in some cases the dimensionality can stay the same, e.g. a matrix transformation, or even increase, e.g. if a time-series is required for the model analytics.

The model analytics can include predictive model analytics 240, decision model analytics 250, and descriptive model analytics 260. For example, a tuned predictive model analytic 240 can predict the likelihood that the network 212 is indicative of a collusive fraud, the decision model analytics 250 can decide that a loan application should be denied, or the descriptive model analytics 260 can indicate that individuals in the network 212 are part of a family group and should be considered related.

In our example, a predictive model (e.g. neural network, score card) can be trained by providing it with a history of network, their vectors 230, and their ultimate outcome (fraudulent/not fraudulent). Once the predictive model is trained, the network 212 and its vector 230, can be provided as input to the predictive model analytics 240. The predictive model analytics 240 can then generate output 270, which can be in the form of a prediction 242, i.e. likelihood of fraud. The prediction 242 can have additional metadata included, e.g. confidence level or degree of severity. The prediction 242 can be purely machine-readable, i.e. another vector 230, a table, an array, a list, a record, or a matrix. The prediction 242 can also be in the form of displayed output 270, e.g. readout, printout, or result viewable on a computing device. The prediction 242 can be any combination or mixture of machine-readable data and displayed data.

The decision model analytics 250 can accept the vector 230 and execute the decision model analytics 250 (e.g. Blaze, Drools) to make a decision 252 about a course of action. The decision 252 can be restricted by one more rules that can be integrated into the execution of the decision model analytics 250. For example, the rule might say "assert fact: auto body shop >20 miles from claimant home address" and "assert fact: same car involved in 2 accidents <1 month."

The descriptive model analytics 260 can examine the vector 230, the network 212, or any combination or sub-combination thereof, and generate output 270 in the form of a classification 262. The description can classify the vector 230, the network 212, or any other quantity or data structure according to a rule set. For example, the descriptive model can examine a network 212 and classify the network 212 as a 'Claimant/Provider Collusion Ring" network 212. The classification 262 can then be transmitted to the user, or as discussed below, returned to one or more analytics for further analysis.

The prediction 242, the decision 252, and/or the classification 262, and/or other data, can be combined in any manner to form an output 270. The output 270 can be any result requested by the user and provided by the analytics in the data pipeline 200. The output 270 can be in any form, e.g. text, arrays, tables, or images. The output 270 can be saved, transmitted, displayed, set a status, modify a workflow, or any combination thereof, on or to one or more computers (see FIG. 7). Also, the network 212 can be included in the output 270. The network 212 can be passed by reference to a stored copy of the network 212 or by value where an actual copy of the network 212 is included.

There can also be a user interface 280 where the output 270 and/or other processes described herein can be viewed, manipulated, or otherwise worked with by a user. The user interface 280 can be a computer, mobile device, tablet, or any other machine that a user can interact with to execute the operations described in the data pipeline 200.

Figure 3:
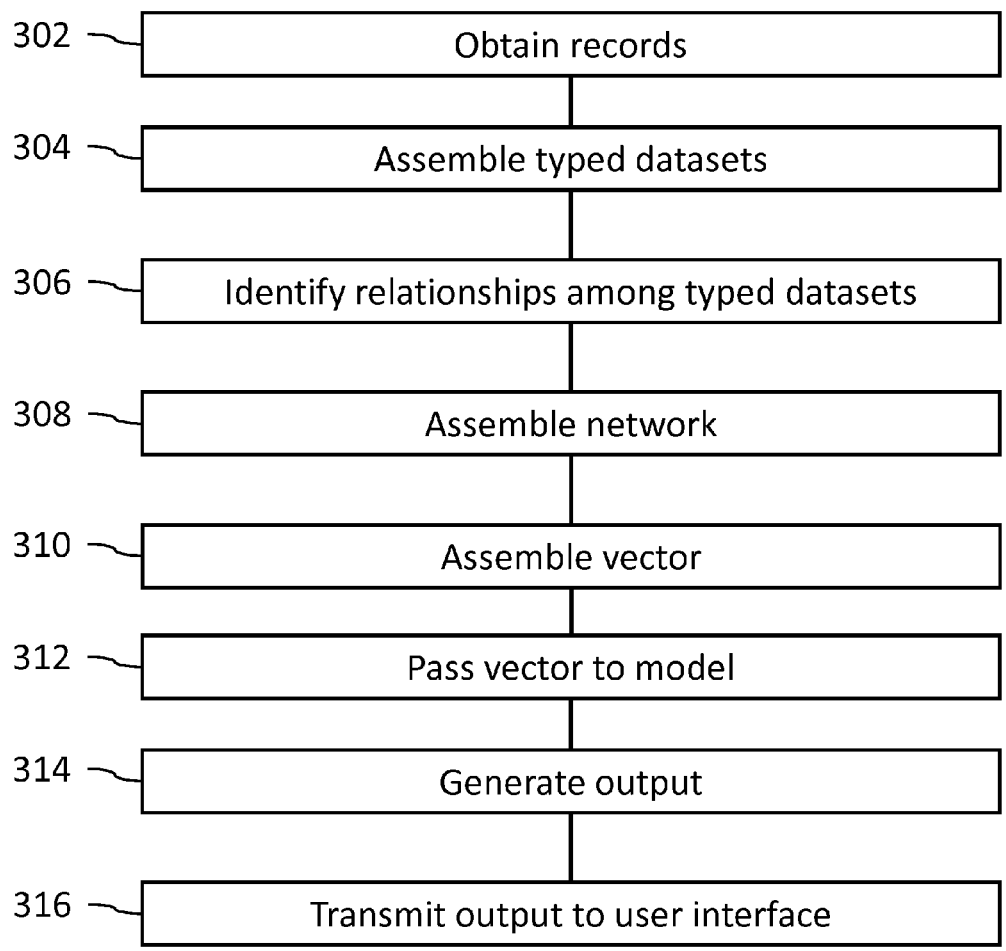
FIG. 3 is a process flow diagram illustrating a computer-implemented analysis process.

FIG. 3 is a process flow diagram 300 illustrating a computer-implemented analysis process. FIG. 3 describes, in process flow form, the process described largely in FIG. 2, above. At 302, one or more of the records are obtained. At 304, the records are assembled into the typed datasets 208. At 306, the network assembler identifies relationships among the typed datasets 208. At 308, the network assembler 210 assembles the network 212. At 310, the vector 230 is assembled after analyzing the network 212. At 312, the vector 230 is passed to one or more model analytics. At 314, the model analytics generate the output. At 316, the output 270 is transmitted to the user interface 280.

Figure 4:
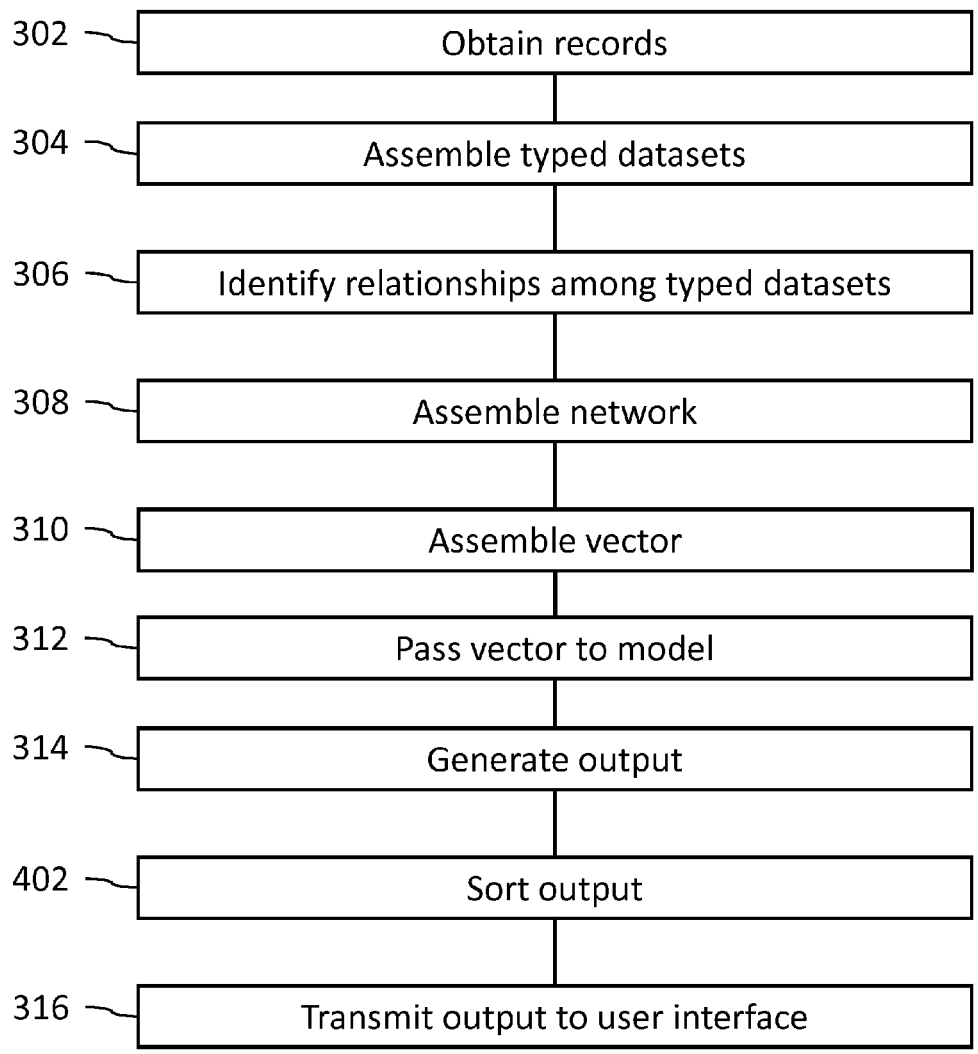
FIG. 4 is a process flow diagram illustrating a computer-implemented analysis process with sorted output.

FIG. 4 is a process flow diagram 400 illustrating a computer-implemented analysis process with sorted output. FIG. 4 is very similar to FIG. 3, described above, but in one implementation can include, at 402, sorting the output 270. Examples of the sorting can include ordering the output 270 by prediction result, e.g. likelihood of fraud, decision result, e.g. whether or not to close a claim, or classification result, e.g. network members with shared attributes.

Figure 5:
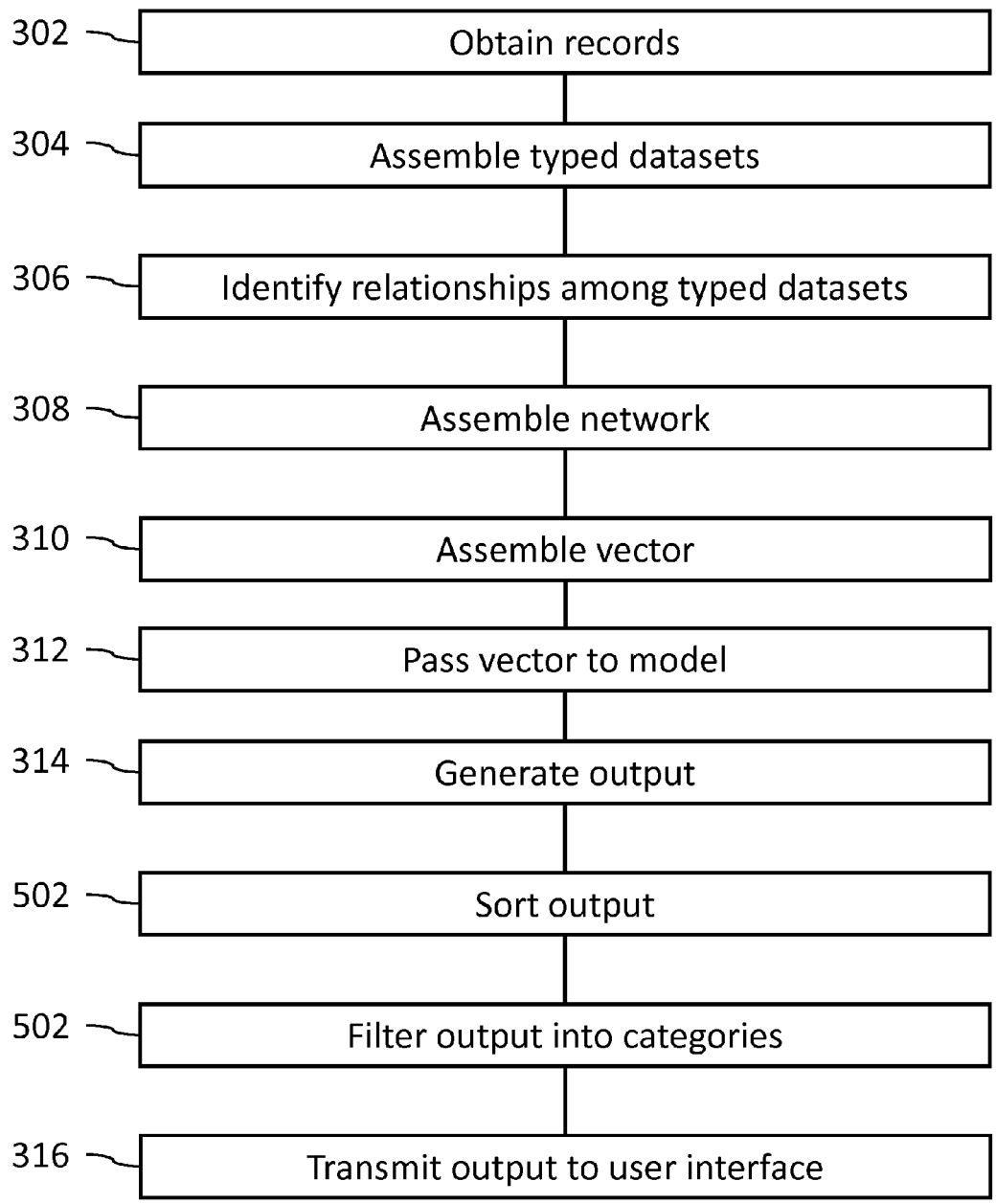
FIG. 5 is a process flow diagram illustrating a computer-implemented an analysis process with filtered output.

FIG. 5 is a process flow diagram illustrating 500 a computer-implemented an analysis process with filtered output. FIG. 5 is very similar to FIG. 4, described above, but in one implementation can include, at 402, filtering the output 270 into categories. Examples of the filtering can include taking output indicative of fraud and placing them into risk categories, e.g. low risk, medium risk, or high risk. Other examples can include the filtering the output 270 of the decision model analytics 250 into a binary classification, e.g. yes or no.

Figure 6:
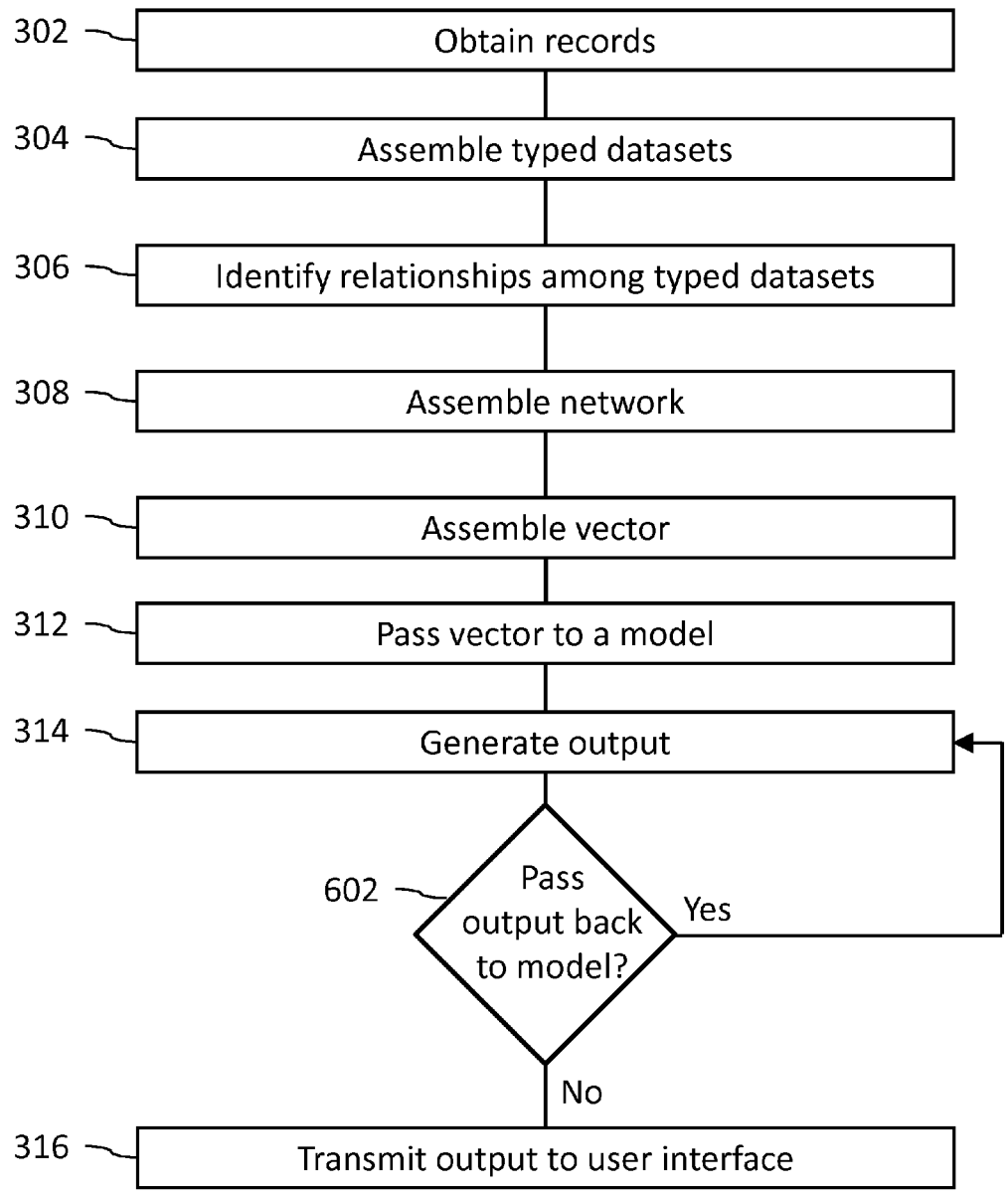
FIG. 6 is a process flow diagram illustrating a computer-implemented iterative analysis process.

FIG. 6 is a process flow diagram illustrating 600 a computer-implemented iterative analysis process. FIG. 6 is very similar to FIG. 3, but can include, at 602, passing the output 270 back, as input into any of the analytics, if a determination by the analytic is made that the output 270 is to be passed back. Again, at 314, another instance of the output 270 is generated and the conditional is repeated at 602. This can describe an iterative process, e.g. the model analytic must execute X number of times to achieve convergence and/or reducing calculated uncertainties to an acceptable tolerance level. When the model analytic determines that the output does not need to be passed back, then at 316 the output 270 can be transmitted to the user interface 280.

Figure 7:
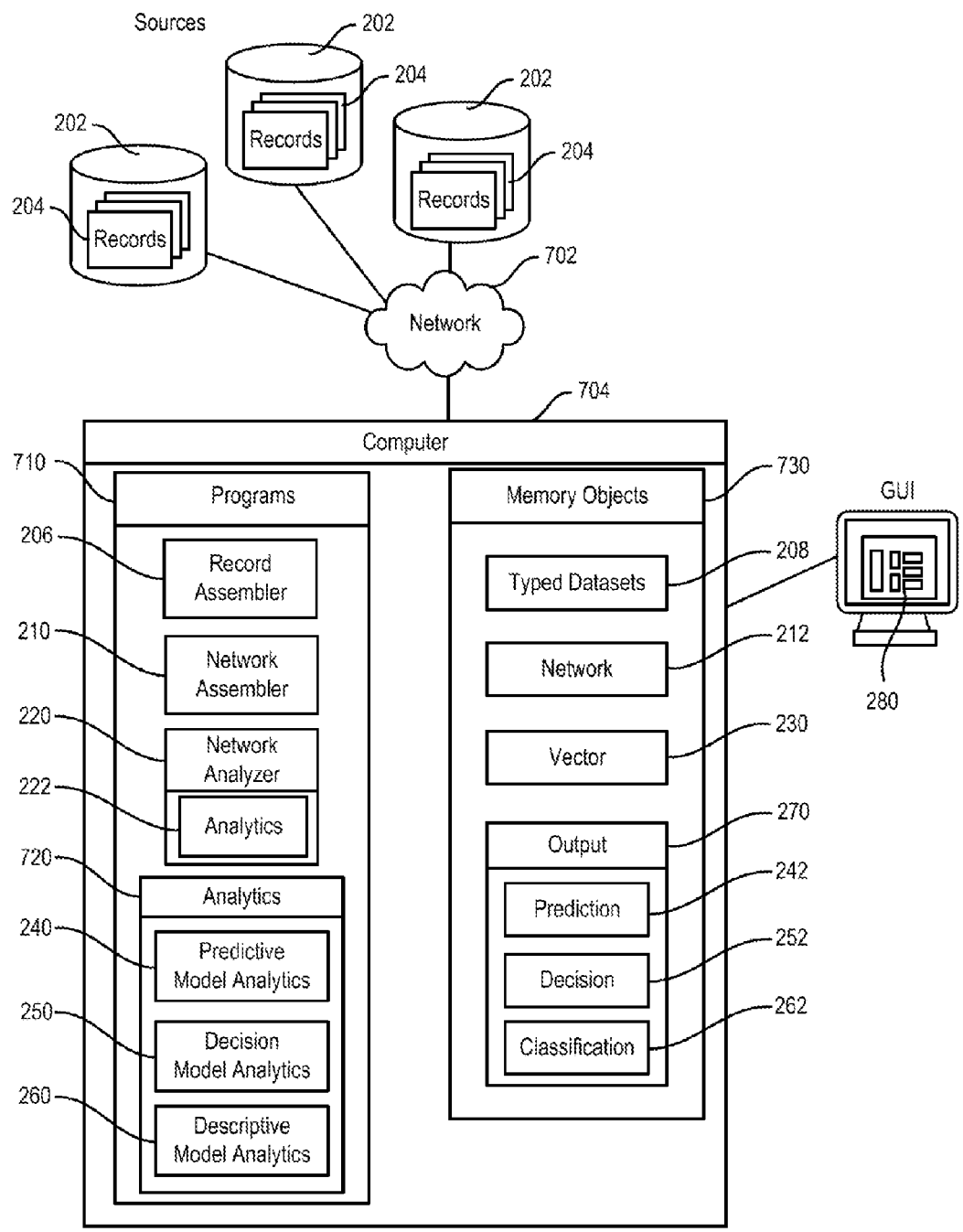
FIG. 7 is a diagram illustrating a system for combining network analysis and predictive analytics.

FIG. 7 is a diagram illustrating a system 700 for combining network analysis and predictive analytics. As shown in FIG. 7, there can be a network 702 that connects the sources 202 to a computer 704. The computer can have a set of programs 710 which can include the record assembler 206, the network assembler 210, the network analyzer 220, and analytics 720. The network analyzer 220 can include analytics 222. The analytics 720 can include the predictive model analytics 240, the decision model analytics 250, and the descriptive model analytics 260.

The computer 704 can also have one or more memory objects 730 stored in the computer memory. The memory objects 730 can include the typed datasets 208, the network 212, the vector 230, and the output 270. The output 270 can include the predictions 242, the decisions 252, and the classifications 262 from the analytics 720.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A method for implementation by one or more data processors forming part of at least one computing system, the method comprising:
    obtaining, by at least one data processor, a plurality of records from a plurality of sources, the plurality of records comprising a plurality of types of data;
    assembling, by at least one data processor, a plurality of typed datasets based on the obtained records, the assembling comprising:
        extracting, from the plurality of records, typed data that corresponds to all data of a single type found in the obtained records;
    assembling, by at least one data processor, at least one network comprising:
        a plurality of nodes representing all instances of the typed data corresponding to a common event; and
        a plurality of edges representing a relationship between the plurality of nodes, the relationship defining a connection between two or more of the plurality of nodes, where the edges comprise a weighting attribute representing a similarity between the nodes connected by the connection, the plurality of nodes and the plurality of edges stored as accessible memory objects in the at least one computing system;
    assembling, by at least one data processor, a vector by using a network analyzer, the assembling comprising:
        determining a required input format for an analytic configured to operate on the vector; and
        generating, at the network analyzer, the vector comprising a subset of the typed data corresponding to the required input format;
    passing, by at least one data processor, the vector to the analytic;
    generating, by at least one data processor and the analytic, an output from the analytic based on at least the vector passed to the analytic, the output comprising electronic data corresponding to a result of the analytic operating on the vector; and
    providing, by at least one data processor, data comprising the output.

2. The method of claim 1, wherein providing the data comprises at least one of: displaying the data, transmitting the data to a remote node, storing the data, or loading the data into a memory.

3. The method of claim 1, wherein the analytic is a predictive analytic configured to generate electronic data corresponding to a predictive output based at least on a provided query and historical data for the typed data.

4. The method of claim 1, wherein the analytic is a decision analytic configured to provide electronic data corresponding to a decision generated by applying one or more rules to the vector comprising the subset of the typed data.

5. The method of claim 1, wherein the analytic is a descriptive analytic configured to perform operations comprising:
    selecting a rule set to apply to the vector, to the network, or to both, by accessing a stored collection of rule sets;
    generating a classification of the vector or the network based at least on the rule set; and
    providing electronic data corresponding to the classification.

6. The method of claim 1, wherein the analytic includes a node analytic configured to perform operations comprising:
    receiving a node reference identifying at least one of the plurality of nodes, and a query corresponding to the node;
    generating a connectedness of the node based at least on a number of nodes that the node is connected to in the network; and
    providing electronic data corresponding to the connectedness.

7. The method of claim 1, wherein the analytic includes an edge analytic configured to perform operations comprising:
    receiving an edge reference and at least two node references; and
    generating, from the edge reference and the at least two node references, a response to a query corresponding to a feature common to the at least two node references.

8. The method of claim 1, wherein the analytic includes a network analytic configured to perform operations comprising:
    receiving a query for a number of the nodes in the network;
    analyzing, at the network analytic, the network to determine the number of the nodes in the network; and
    providing electronic data corresponding to the number of nodes in the network.

9. The method of claim 1, the assembling further comprising: reducing, by at least one data processor, a dimensionality of the vector relative to the network to allow the analytic to receive the vector and generate the output.

10. The method of claim 1, the output comprising a reference to a stored copy of the network.

11. The method of claim 1 further comprising appending, to the vector, a time-series corresponding to at least one dimension of the vector to make the dimensionality of the vector compatible with the analytic.

12. A non-transitory computer program product storing instructions which, when executed by at least one data processor forming part of at least one computing system, result in operations comprising:

obtaining, by at least one data processor, a plurality of records from a plurality of sources, the plurality of records comprising a plurality of types of data;
assembling, by at least one data processor, a plurality of typed datasets based on the obtained records, the assembling comprising:
  extracting, from the plurality of records, typed data that corresponds to all data of a single type found in the obtained records;
assembling, by at least one data processor, at least one network comprising:
  a plurality of nodes representing all instances of the typed data corresponding to a common event; and
  a plurality of edges representing a relationship between the plurality of nodes, the relationship defining a connection between two or more of the plurality of nodes, where the edges comprise a weighting attribute representing a similarity between the nodes connected by the connection, the plurality of nodes and the plurality of edges stored as accessible memory objects in the at least one computing system;
assembling, by at least one data processor, a vector by using a network analyzer the assembling comprising:
  determining a required input format for an analytic configured to operate on the vector; and
  generating, at the network analyzer, the vector comprising a subset of the typed data corresponding to the required input format;
passing, by at least one data processor, the vector to the one analytic;
generating, by at least one data processor and the analytic, an output from the analytic based on at least the vector passed to the analytic, the output comprising electronic data corresponding to a result of the analytic operating on the vector; and
providing, by at least one data processor, data comprising the output.

13. The computer program product of claim 12, wherein providing the data comprises at least one of: displaying the data, transmitting the data to a remote node, storing the data, or loading the data into a memory.

14. The computer program product of claim 12 the assembling further comprising: reducing, by at least one data processor, a dimensionality of the vector relative to the network to allow the analytic to receive the vector and generate the output.

15. The computer program product of claim 12 further comprising:
appending, to the vector, a time-series corresponding to at least one dimension of the vector to make the dimensionality of the vector compatible with the analytic.

16. A system comprising:
at least one programmable processor; and
a non-transient machine-readable medium storing instructions which, when executed by the at least one programmable processor, cause the at least one programmable processor to perform operations comprising:
obtaining, by at least one data processor, a plurality of records from a plurality of sources, the plurality of records comprising a plurality of types of data;
assembling, by at least one data processor, a plurality of typed datasets based on the obtained records, the assembling comprising:
  extracting, from the plurality of records, typed data that corresponds to all data of a single type found in the obtained records;
assembling, by at least one data processor, at least one network comprising:
  a plurality of nodes representing all instances of the typed data corresponding to a common event; and
  a plurality of edges representing a relationship between the plurality of nodes, the relationship defining a connection between two or more of the plurality of nodes, where the edges comprise a weighting attribute representing a similarity between the nodes connected by the connection, the plurality of nodes and the plurality of edges stored as accessible memory objects in the at least one computing system;
assembling, by at least one data processor, a vector by using a network analyzer, the assembling comprising:
  determining a required input format for an analytic configured to operate on the vector; and
  generating, at the network analyzer, the vector comprising a subset of the typed data corresponding to the required input format;
passing, by at least one data processor, the vector to the one analytic;
generating, by at least one data processor and the analytic, an output from the analytic based on at least the vector passed to the analytic, the output comprising electronic data corresponding to a result of the analytic operating on the vector; and
providing, by at least one data processor, data comprising the output.

17. The system of claim 16, wherein the providing the data comprises at least one of: displaying the data, transmitting the data to a remote node, storing the data, or loading the data into a memory.

18. The system of claim 16 the assembling further comprising: reducing, by at least one data processor, a dimensionality of the vector relative to the network to allow the analytic to receive the vector and generate the output.

19. The system of claim 16 further comprising:
appending, to the vector, a time-series corresponding to at least one dimension of the vector to make the dimensionality of the vector compatible with the analytic.

* * * * *